Jan. 7, 1930. S. R. WING 1,742,840
BALL BEARING AND METHOD OF MAKING SAME
Filed Dec. 23, 1927
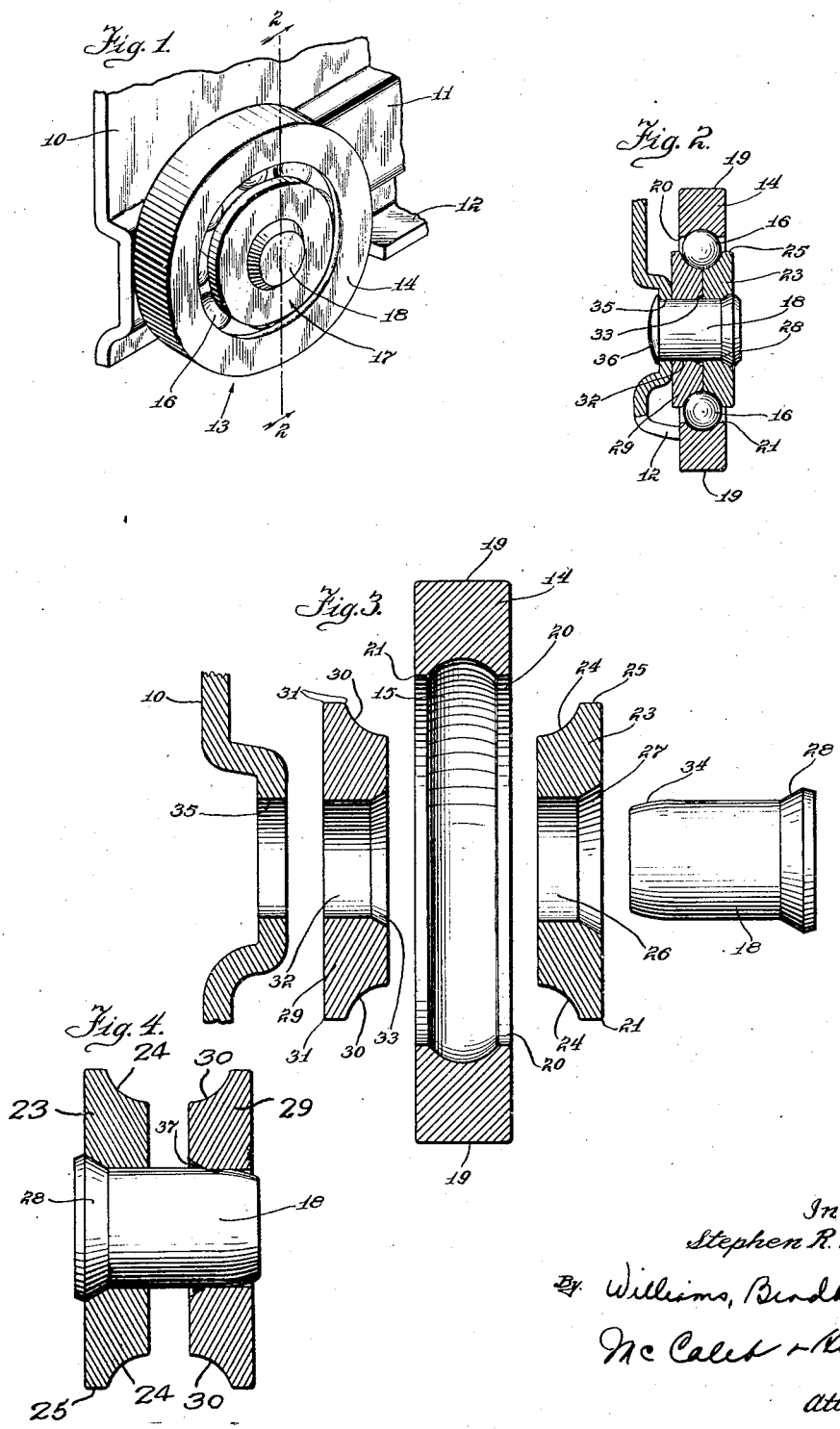

Patented Jan. 7, 1930

1,742,840

UNITED STATES PATENT OFFICE

STEPHEN R. WING, OF ROCHESTER, NEW YORK, ASSIGNOR TO YAWMAN AND ERBE MFG. CO., OF ROCHESTER, NEW YORK, A CORPORATION OF NEW YORK

BALL BEARING AND METHOD OF MAKING SAME

Application filed December 23, 1927. Serial No. 242,246.

This invention relates to ball bearings and method of making them and it pertains more particularly to ball bearing construction adapted to be used on sliding plates, especially the progressive roller slides used to support drawers in filing cabinets.

In ball bearings of this type the outer or inner ball race is split into two sections so that the balls may be inserted and subsequently locked in place. In making the ball race in two sections, however, there is danger that these sections may become loose or misaligned. Especially in the case where the rivet or stud which holds the ball race members together and also secures them to the plate, there is a tendency for the inner ball race member to be held off to one side or to be mis-aligned. This increases the noise and friction and causes rapid destruction of the balls. An object of this invention is to overcome these difficulties.

A further object is to provide a ball bearing structure which is self-contained and which may readily be secured to a sliding plate.

A further object is to provide a forced-fit structure with means for allowing for metal chipped or shaved off in the forced-fit operation.

A further object is to provide a more simple, accurate, rigid and dependable structure and to reduce the cost of manufacture and the cost of assembly.

Other object will be apparent as the detailed description of my invention proceeds.

In the accompanying drawings, which represent a preferred embodiment of my invention and in which like parts are represented by similar reference characters, Figure 1 is a perspective of my improved ball bearing as applied to a progressive drawer slide;

Fig. 2 is a section taken along the lines 2—2 of Fig. 1;

Fig. 3 is an exploded view of the improved ball bearing structure, and

Fig. 4 is a detail section illustrating a means for receiving the metal shaved off the rivet.

Referring to Fig. 1, a stamped sheet metal drawer slide 10 is provided with suitable guide and reinforcing flanges 11 and 12, to one of which is secured the ball bearing 13. This ball bearing is composed of a case hardened steel roller 14, provided with an annular groove 15, which serves as the outer ball race and contains ball bearings 16. These ball bearings are held in an inner ball race 17 formed of complementary sections which will be designated as the "near" section 29 and the "far" section 23, the point of reference being the support on which the bearing structure is mounted. These two sections are held together by a stud or rivet 18, this rivet performing the double function of holding the inner sections in rigid and aligned position and of securing them to the plate 10.

The outer ball race is preferably a ring of case hardened steel. Its outer periphery 19 forms a drawer suspension roller, its inner periphery 20 forms the outer ball race, being provided with an annular groove 15, the small radius of which is slightly larger than the radius of the balls used. The inner edges 21, which lie between the sides of the ring and the annular groove 15, are preferably chamfered slightly to remove sharp edges or burrs. The steel balls are of the type conventionally used in such constructions.

The inner ball race is made in two sections as shown in Figures 2 to 4. The far section 23 is provided with a groove 24 which forms half of the inner ball race. The edge 25 between this groove and the outer surface of the section 23 is preferably slightly chamfered to remove sharp edges and burrs. This far section or disc 23 is provided with an aperture 26 which is slightly larger than the diameter of the stud 18 so that it may be easily inserted over this stud. The disc is counter-sunk at 27 at an angle corresponding to the angle of the shoulder 28 on the stud 18. This conical shoulder on the stud co-acts with the counter-sunk portion of the disc to center this member when the bearing is assembled.

The near section of the inner ball race is formed by disc 29 which has a groove 30 supplementing groove 24 to form the inner ball race and which has chamfered edges 31 to give it a workmanlike finish. The disc 29 is provided with an aperture 32 which is slightly smaller than the diameter of the stud 18 before these parts are assembled. It is provided with a countersunk or chamfered portion 33, the function of which will be hereinafter described. Both discs 23 and 29 are preferably of case hardened steel.

The stud or rivet 18 is preferably of cold rolled steel annealed for riveting and is provided with a conical shoulder 28 as above stated. This rivet is of substantially uniform diameter along the greater portion of its length but it is slightly tapered on the end 34 opposite shoulder 28 and all the sharp edges are chamfered.

The bearing is assembled by inserting the far race disc 23 on the stud 18 with its counter-sunk portion 27 coacting with the shoulder 28 of the stud. The outer ball race member 14 is next positioned and the balls are inserted between these members. The near ball race member 29 is then forced over the stud 18 by means of a suitable press. Since the diameter of the aperture of the inner race member 29 is smaller than the diameter of stud 18, and since member 29 is case hardened while the stud is annealed, it will be evident that shavings or chips of metal 37 will be removed from the stud during this operation. In order to prevent these metal chips or shavings 37 from separating members 23 and 29, I have provided a counter-sunk portion or recess 33 for receiving these fragments. It is obvious that other means may be used to accomplish this result; for example, the far disc may be provided with a recess in the side facing the near disc. Some means should be provided, however, for receiving these metal chips or shavings. The function of counter-sunk portion 33 is clearly shown in Fig. 4 which represents the operation of forcing these members together.

The outer race member 14 is slightly narrower than the combined thickness of inner race members 23 and 29. Therefore the bearing may be riveted against the side of a metal plate as shown in Fig. 2 by inserting the end 34 of the stud 18 in the aperture 35 and overturning said end to provide a riveted end 36. Since the near race member 29 is firmly fixed on the stud there will be no possibility of misalignment of members 23 and 29 and the inner ball race will at all times be perfectly smooth and even. It is to be noted that this bearing is self-contained; that is, it may be assembled before it is riveted on the plate, thus making the manipulation very simple. It should also be noted that all of the parts are extremely simple and easy to make and that the resulting bearing is cheaper and more substantial than those heretofore used. The relative diameter of the stud as compared with the diameters of the openings in members 23 and 29 may vary but in the preferred embodiment the stud is .247" in diameter, the aperture in the far disc 23 is .252" in diameter and the aperture of the near disc 29 is .246" in diameter.

While I have described in detail a specific embodiment of my invention, it is understood that I am not limited to the specific details except as defined by the following claims.

I claim:

1. In ball bearing structure, a stud, a tapered shoulder on said stud, a far split ball race member provided with an aperture slightly larger than the diameter of said stud and with a recess adapted to co-act with said shoulder for centering the member on the stud, and a near split race member provided with an aperture slightly smaller than the diameter of said stud, said near member being forced on said stud to hold the parts centered and in fixed relation.

2. In ball bearing structure, a stud, a far split ball race member, a near split ball race member, means on the stud for retaining the outer member, means in addition to the usual chamfer for receiving metal scraped from said stud when the near member is forced thereon whereby the near and far split ball race members may be juxtaposed with no metal between them.

3. In ball bearing structure, a stud, a tapered shoulder on said stud, a far ball race disc provided with an aperture slightly larger than the diameter of said stud and provided with a tapered shoulder adapted to co-act with the shoulder on the stud for centering said disc on said stud, and a near ball race disc provided with an aperture slightly smaller than the diameter of said stud and with a recess for receiving metal scraped from the stud when the near disc is forced on the stud to hold the parts together.

4. In combination, a stud of malleable metal, a ball race member of hardened metal provided with an aperture smaller than the diameter of the stud, and a recess in addition to the usual chamfer around the aperture for receiving shavings of the malleable metal removed when the hard metal member is forced over it.

5. In a ball bearing structure, a mounting stud having preformed centering and abutment means, a far ball race disc mounted thereon, said means co-operating with centering and abutment means on the disc, a near ball race disc having a mounting aperture through which the stud passes, the near disc being fixed on the stud under heavy friction between the stud and the walls of the aperture to hold the first disc against inward movement and to retain the discs and stud assembled, the end of the stud projecting beyond the second race for mounting the assembly on a support.

6. An inner race structure for a ball bearing, comprising a mounting pin having a preformed inwardly facing centering abutment adjacent one end and a shank of substantially uniform diameter, a first race half fitted upon the pin relatively loosely without distorting the surface of the shank and in contact with the abutment, and a second race half mounted on the pin with a drive fit to retain the two race halves and the pin in assembled relation, the second race half being of harder metal than the shank of the pin whereby it trues the shank for centering the second race half, there being left a length of pin at the end opposite the abutment extending beyond the outer face of the second race half for mounting the assembly upon a support.

7. A ball bearing structure of the class described comprising a pair of inner race halves and a mounting pin therefor, for assembly into a unitary inner race member, the mounting pin having a preformed inwardly facing tapered shoulder, the first race half having a complementary recess and fitting on to the pin relatively loosely whereby the shoulder and recess cooperate to center the race half, the second race half fitting the pin with a drive fit and applicable after the said adjacent race is in position to retain the latter in centered position and to retain the two halves and the pin in assembled relation, and a supporting member engaging the far race half and having a mounting bore into which the pin extends and to which member it is secured for mounting the inner race assembly and for further retaining it in assembled relation.

8. An inner race structure for a ball bearing, comprising a mounting pin having an inwardly facing abutment and a shank of substantially uniform diameter, a first inner race half fitting on to the pin relatively loosely and engaging the abutment, there being bevel surface means on the first race half for centering it, a second inner race half having a drive fit on the pin sufficient to hold itself, the first race half and the pin in assembled relation, and a supporting member having an aperture by which it is mounted on the end of the pin opposite the shoulder, the pin being fixed to the supporting member to secure the latter in contact with the second race half and thereby further to secure the race halves and the pin in assembled relation.

9. The method of forming and mounting an inner race assembly for a ball bearing, which consists in mounting a first race half relatively loosely on a mounting pin and in contact with a centering shoulder on the pin, drive-fitting a second race half on the pin and in contact with the first race half to hold the latter in centered relation and to hold the two race halves and the pin in assembly, and subsequently passing the end of the pin opposite the shoulder through a supporting member and securing the pin on the supporting member with the latter in contact with the second race half for mounting the race assembly on the support and for further retaining the race halves and pin in assembled relation.

10. The method of forming and mounting an inner race assembly for a ball bearing, which consists in mounting a first race half relatively loosely on a mounting pin and in contact with a centering shoulder on the pin, drive-fitting a second race half on the pin and in contact with the first race half to hold the latter in centered relation and to hold the two race halves and the pin in assembly, leaving an end of the pin protruding beyond the second race half for securement to a supporting member.

11. The method of assembling the inner race structure of a ball bearing, which consists in mounting a first race half, having a centering recess, on a mounting pin having an inwardly facing centering shoulder for cooperation therewith and a shank of substantially uniform diameter, said mounting being relatively loose whereby the surface of the shank of the pin is not distorted by its application, mounting a second race of harder metal than the pin upon the pin with a drive fit whereby the second race half trues the shank of the pin for its mounting and with the second race half in contact with the first to hold the first in centered relation.

In witness whereof, I hereunto subscribe my name this 15th day of December, 1927.

STEPHEN R. WING.